(12) United States Patent
Ozeki et al.

(10) Patent No.: US 11,203,550 B2
(45) Date of Patent: Dec. 21, 2021

(54) CHEMICALLY STRENGTHENED GLASS PLATE, PORTABLE INFORMATION TERMINAL, AND MANUFACTURING METHOD OF CHEMICALLY STRENGTHENED GLASS PLATE

(71) Applicant: AGC INC., Chiyoda-ku (JP)

(72) Inventors: Masao Ozeki, Tokyo (JP); Satoshi Ogami, Tokyo (JP); Takanori Fukushi, Tokyo (JP)

(73) Assignee: AGC INC., Chiyoda-ku (JP)

( * ) Notice: Subject to any disclaimer, the term of this patent is extended or adjusted under 35 U.S.C. 154(b) by 89 days.

(21) Appl. No.: 16/394,031

(22) Filed: Apr. 25, 2019

(65) Prior Publication Data
US 2019/0330103 A1      Oct. 31, 2019

(30) Foreign Application Priority Data

Apr. 27, 2018  (JP) .............................. JP2018-087712
Aug. 9, 2018   (JP) .............................. JP2018-150379

(51) Int. Cl.
*B32B 3/00*       (2006.01)
*C03C 21/00*      (2006.01)
(Continued)

(52) U.S. Cl.
CPC ........ *C03C 21/001* (2013.01); *C03B 23/0302* (2013.01); *C03C 3/083* (2013.01);
(Continued)

(58) Field of Classification Search
CPC ....... B32B 3/263; C03C 3/076; C03C 21/001; C03C 21/002; C03C 2201/50;
(Continued)

(56) References Cited

U.S. PATENT DOCUMENTS

2014/0331716 A1   11/2014   Ahmed et al.
2014/0370244 A1   12/2014   Kinoshita
(Continued)

FOREIGN PATENT DOCUMENTS

JP      2013-121897      6/2013
JP      2013-125118      6/2013
(Continued)

OTHER PUBLICATIONS

JP 2013-121897 Machine Translation (Year: 2013).*
JP 2013-125118 Machine Translation (Year: 2013).*

*Primary Examiner* — Zachary M Davis
(74) *Attorney, Agent, or Firm* — Oblon, McClelland, Maier & Neustadt, L.L.P.

(57) ABSTRACT

An object of the present invention is to provide a chemically strengthened glass plate that is chemically strengthened and thereby increased in strength in its entirety, a portable information terminal using the chemically strengthened glass plate, and a manufacturing method of the a chemically strengthened glass plate. The chemically strengthened glass plate and the manufacturing method thereof according to the present invention is suitable for use in fields of portable information terminals, substrates, etc. in which glass plates having high resistance to impact are required.

17 Claims, 10 Drawing Sheets

(51) Int. Cl.
    *C03B 23/03*     (2006.01)
    *C03C 19/00*     (2006.01)
    *C03C 3/087*     (2006.01)
    *C03C 3/091*     (2006.01)
    *C03C 3/093*     (2006.01)
    *C03C 3/083*     (2006.01)
    *C03C 3/097*     (2006.01)

(52) U.S. Cl.
    CPC .............. *C03C 3/087* (2013.01); *C03C 3/091* (2013.01); *C03C 3/093* (2013.01); *C03C 3/097* (2013.01); *C03C 19/00* (2013.01)

(58) Field of Classification Search
    CPC ....... C03B 23/02; C03B 23/023; C03B 23/03; C03B 23/0302; C03B 23/0307
    See application file for complete search history.

(56) References Cited

U.S. PATENT DOCUMENTS

| | | |
|---|---|---|
| 2016/0162615 A1 | 6/2016 | Ahmed et al. |
| 2016/0357294 A1 | 12/2016 | Ozeki et al. |
| 2017/0082577 A1* | 3/2017 | Roussev ................ G01N 27/72 |
| 2019/0248098 A1 | 8/2019 | Ozeki et al. |

FOREIGN PATENT DOCUMENTS

| | | |
|---|---|---|
| JP | 2017-001902 | 1/2017 |
| JP | 2017-1940 A | 1/2017 |
| JP | 2017-048090 | 3/2017 |
| WO | WO 2013/088910 A1 | 6/2013 |
| WO | WO 2013/088989 A1 | 6/2013 |
| WO | 2016-524582 A | 8/2016 |

* cited by examiner

US 11,203,550 B2

CHEMICALLY STRENGTHENED GLASS PLATE, PORTABLE INFORMATION TERMINAL, AND MANUFACTURING METHOD OF CHEMICALLY STRENGTHENED GLASS PLATE

FIELD OF THE INVENTION

The present invention relates to a chemically strengthened glass plate, a portable information terminal, and a manufacturing method of a chemically strengthened glass plate.

BACKGROUND OF THE INVENTION

In recent years, chemically strengthened glass plates have come to be used as cover members of portable information terminals (portable electronic devices) such as smartphones in place of synthetic resins (see Patent documents 1 and 2). Additionally, techniques for chemically strengthening a glass plate are known.

Patent document 1 relates to a cover glass for a display that has a central region and a curved region formed to be curved and in which on the back surface side a compressive stress layer formed in the curved region is thicker than a compressive stress layer formed in the central region. Patent document 1 discloses that prescribed strength is kept in an inside region of the curve of the portion formed to be curved.

Patent document 2, which is similar to Patent document 1, discloses that a curved region is thicker than a central region by 0.5 mm to 2.5 mm and is formed so that, in a concave region located inside the curve of the curved region, an approximate radius R (radius of curvature) of a region having a smallest approximate radius R is larger than or equal to 2.5 mm.

Patent document 1: JP-A-2013-121897
Patent document 2: JP-A-2013-125118

SUMMARY OF THE INVENTION

Patent documents 1 and 2 pay attention to the fact that a curved portion of a glass plate is vulnerable to impact and prone to break, and disclose to form a thick compressive stress layer when the glass plate is used for electronic devices such as cellphones. However, there is a problem that even if a glass plate is chemically strengthened in the ranges disclosed in these patent documents, the chemical strengthening of the entire glass plate is insufficient and, in particular, ends and end faces are insufficient in strength such as impact resistance.

An object of the present invention is to provide a chemically strengthened glass plate that is chemically strengthened and thereby increased in strength in its entirety, a portable information terminal using the chemically strengthened glass plate, and a manufacturing method of the a chemically strengthened glass plate.

The present invention provides a chemically strengthened glass plate including: a first face; a second face opposed to the first face; a first region having a prescribed thickness in the normal direction to a tangential line to the first face; and a second region including a region that is thicker than the prescribed thickness of the first region, in which the first region is a continuous region having a thickness range of a minimum thickness $W_A$ to $1.1 \times W_A$, the second region includes a region having a thickness larger than $1.1 \times W_A$ and has a maximum thickness $W_B$, the second region has a portion where a compressive stress layer is formed deeper than a compressive stress layer of the first region, a depth $L_A$ of the compressive stress layer from the first face at a position having the thickness $W_A$ and a depth $L_B$ of the compressive stress layer from the first face at a position having the thickness $W_B$ satisfy a relation $L_B/L_A \geq 1.2$, and the depth $L_A$ of the compressive stress layer and the depth $L_B$ of the compressive stress layer each are larger than or equal to 80 μm.

In the chemically strengthened glass plate according to the present invention, since the depth $L_A$ of the compressive stress layer of the first region and the depth $L_B$ of the compressive stress layer of the second region satisfy the relation $L_B/L_A \geq 1.2$ and the depth $L_A$ of the compressive stress layer and the depth $L_B$ of the compressive stress layer each are larger than or equal to 80 μm, the strength of the entire glass plate is increased and the compressive stress layer of the second region that is thicker than the first region is made deeper. As a result, the strength of the second region including, for example, an end or an end face and its neighborhood is increased, whereby the probability of occurrence of a break that originates from the end or the end face can be lowered, resulting in increase in convenience and safety during use.

BRIEF DESCRIPTION OF THE DRAWINGS

FIG. 1A is a sectional view of the chemically strengthened glass plate according to the first embodiment, and FIG. 1B is a perspective view showing a relation between the chemically strengthened glass plate and a portable information terminal.

FIG. 2A is a sectional view of a chemically strengthened glass plate according to a second embodiment, FIG. 2B is a sectional view showing a relation between the chemically strengthened glass plates according to the first embodiment and a portable information terminal, and FIG. 2C is a sectional view showing a relation between the chemically strengthened glass plates according to the second embodiment and a portable information terminal.

FIG. 6A is a schematic diagram of the stress measuring instrument, FIG. 6B is a block diagram of a computation unit, and FIG. 6C is a flowchart of a measuring process.

DETAILED DESCRIPTION OF THE INVENTION

Figure 1A:
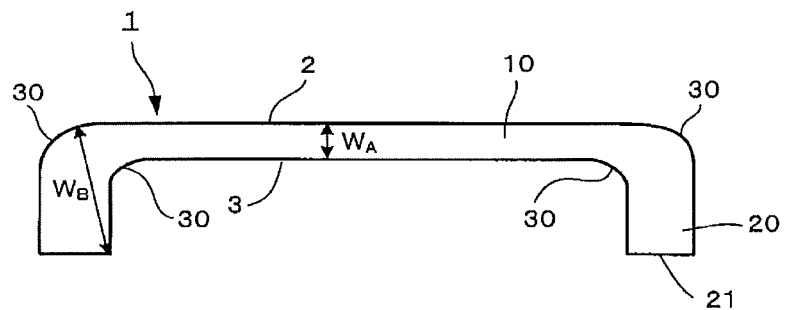
FIGS. 1A and 1B show a chemically strengthened glass plate according to a first embodiment of the present invention.

The details and other features of the present invention will be described by way of modes for carrying out the present invention. The same or corresponding members or components are given the same or corresponding symbol in the drawings and will not be described in a duplicated manner. The drawings are not intended to indicate ratios between members or components unless otherwise specified. Thus, specific dimensions can be selected as appropriate according to non-restrictive embodiments described below.

Chemically strengthened glass plates according to the embodiments of the present invention can be used suitably for, for example, portable information terminals such as portable electronic devices, that is, for example, cover glasses of cellphones, smartphones, tablet PCs, etc. The chemically strengthened glass plates according to the embodiments can also be used for other high-strength-required purposes, that is, magnetic disk substrates, flat panel display substrates, solar cell cover glasses, etc. However, the application range of the chemically strengthened glass plates according to the embodiments is not restricted to these example uses.

FIG. 1A is a sectional view of a glass plate 1 according to a first embodiment. The glass plate 1 includes a first face 2 and a second face 3. The first face 2 is a surface to be touched by a user finger when the glass plate 1 is used as a cover glass of a smartphone or the like, and the second face 3 is a back surface that is opposed to the first face 2. The glass plate 1 has a thickness W which is the distance between the first face 2 and the second face 3, is approximately shaped like a rectangle when viewed in front direction of the first face 2, and has a flat first region 10 and a second region 20 which extends in a different direction from the formation direction (demarcation direction) of the first region 10. The second region 20 is formed so as to surround the periphery of the first region 10 and the glass plate 1 has a bowl-like three-dimensional shape when viewed from the side of the second face 3, that is, from the back surface side.

The sectional view of FIG. 1A is a sectional view taken by cutting the glass plate 1 by a plane that is parallel with one side of an approximately rectangular plan-view shape of the glass plate 1. In this specification, the term "sectional view" means such a sectional view unless otherwise specified. Furthermore, in this specification, the term "glass plate 1" means a chemically strengthened glass plate, that is, a glass plate that has been subjected to a chemically strengthening treatment, unless otherwise specified.

The first region 10 includes a portion where the glass plate 1 has a minimum thickness $W_A$, and is a continuous region whose thickness varies from $W_A$ to $1.1 \times W_A$. The portion having the minimum thickness $W_A$ is located around the center of the glass plate 1 in its width direction (approximately horizontal direction in the drawing) in the cross section of the glass plate 1, and the thickness of the first region 10 increases toward its end from the position having the minimum thickness $W_A$. The first region 10 is a continuous region whose thickness varies from $W_A$ to $1.1 \times W_A$, and the second region 20 is a region that extends from a portion having a thickness larger than $1.1 \times W_A$ to the end of the glass plate 1. The second region 20 may include a portion where the thickness is smaller than $1.1 \times W_A$ at a halfway position when the position goes toward the end of the glass plate 1. That is, in the glass plate 1, the first region 10 is a region where the thickness increases from $W_A$ and reaches $1.1 \times W_A$ for the first time and the second region 20 is a region other than the first region 10.

The thickness of the glass plate 1 means a thickness in a direction that is perpendicular to a tangential line to the first face 2. In the glass plate 1 shown in FIG. 1A, the first region 10 is a region including a (central) portion where the first face 2 is flat and the thickness is constant, and the second region 20 is a region that surrounds the first region 10 and in which the thickness is larger than $1.1 \times W_A$. The first region 10 is not limited to the case that the first face 2 is flat, and may have a curved face as long as the above-described conditions are satisfied. Such a variable thickness glass plate 1 is also called an "uneven thickness glass plate."

The glass plate 1 according to the embodiment has a portion where the radii of curvature of the first face 2 and the second face 3 decrease when the position goes from their central portions toward an end face 21, and the glass plate 1 has a curved portion(s) 30 where the radius of curvature is smallest. It suffices that at least one of the first face 2 and the second face 3 has a curved portion 30, and the glass plate 1 shown in FIG. 1A has the curved portion 30 on the both faces. When having a curved portion(s) 30, the glass plate 1 has such a shape that its thickness varies.

The second region 20 has a flat end face 21 to come into contact with a body 51 of a portable information terminal 50, for example. A line obtained by connecting the first face 2, the end face 21 (on the left side in FIG. 1B), the second face 3, and the end face 21 (on the right side in FIG. 1B) in this order in FIG. 1B constitutes an outer periphery in the sectional view of the glass plate 1. The second region 20 of the glass plate 1 has a maximum thickness $W_B$ which is a maximum value of the thickness in the normal direction to the tangential line to the first face 2.

In the glass plate 1, as viewed in FIG. 1A which is a sectional view, each end face 21 is a straight line portion (face) connecting the first face 2 and the second face 3. However, in the following embodiments, the glass plate 1 as worked into a prescribed shape does not always have an end face. If a flat glass plate before being subjected to working has end faces that connect the two main faces, portions, if any, in a resulting glass plate 1 that were parts of those end faces of the flat glass plate may be regarded as end faces 21.

As for the minimum thickness $W_A$ of the first region 10 and the maximum thickness $W_B$ of the second region 20, it is preferable that the minimum thickness $W_A$ is larger than or equal to 0.3 mm and a relation $W_B/W_A \geq 1.5$ is satisfied. It is even preferable that a relation $W_B/W_A \geq 1.7$ is satisfied, and it is further preferable that a relation $W_B/W_A \geq 1.9$ is satisfied. It is preferable that a relation $W_B/W_A \leq 4$ is satisfied. It is even preferable that a relation $W_B/W_A \leq 3.5$ is satisfied, and it is further preferable that a relation $W_B/W_A \leq 3$ is satisfied. If $W_B/W_A$ is larger than or equal to 1.5, necessary strength of the second region 20 is secured. If $W_B/W_A$ is smaller than or equal to 4, the glass plate 1 can be formed easily by shaping and can be handled easily.

In the glass plate 1 shown in FIG. 1A, the entire second region 20 is thicker than the first region 10 $(1.1 \times W_A)$; however, the present invention is not limited to this case. For example, as described later, the thickness profile of the glass plate 1 may be such that the glass plate 1 is thickest ($W_B$) around the center of the second region 20 and its thickness decreases gradually as the position goes toward the end face 21.

It is preferable that the ratio of the projection area of the first region 10 to the total projection area of the first face 2 as viewed in the direction of the minimum thickness $W_A$ is larger than or equal to 0.5, even preferable that the ratio is larger than or equal to 0.6, and further preferable that the ratio is larger than or equal to 0.7. It is preferable that the ratio is smaller than or equal to 0.98, even preferable that the ratio is smaller than or equal to 0.95, and further preferable that the ratio is smaller than or equal to 0.9.

The glass plate 1 according to the embodiment has been subjected to a chemically strengthening treatment. In the following, the depth of a compressive stress layer formed in the glass plate 1 by the chemically strengthening treatment, the compressive stress, and the tensile stress will be represented by "L," "CS," and "CT," respectively. The compressive stress in the first region 10 will be given a subscript "A" of $W_A$ and those in the second region 20 will be given a subscript "B" of $W_B$.

Figure 1B:
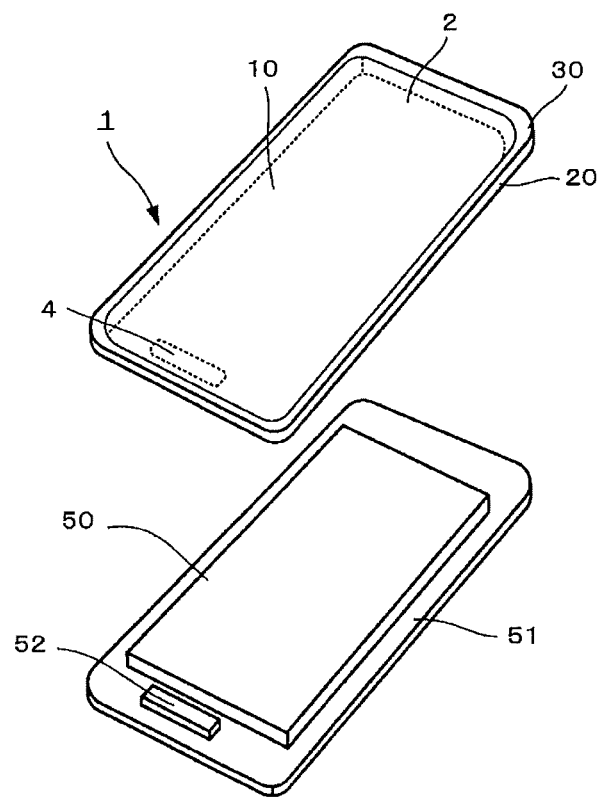

FIG. 1B shows an example manner of use of the glass plate 1. The glass plate 1 is joined to a body 51 of a portable information terminal 50 with adhesive or the like. The second face 3 of the glass plate 1 may be formed with a recess 4 where the glass plate 1 is thinner than in the other portion. For example, the portable information terminal 50 includes a fingerprint sensor 52 and the recess 4 is disposed so as to cover the fingerprint sensor 52 from above so that authentication using it is facilitated.

Figure 2A:
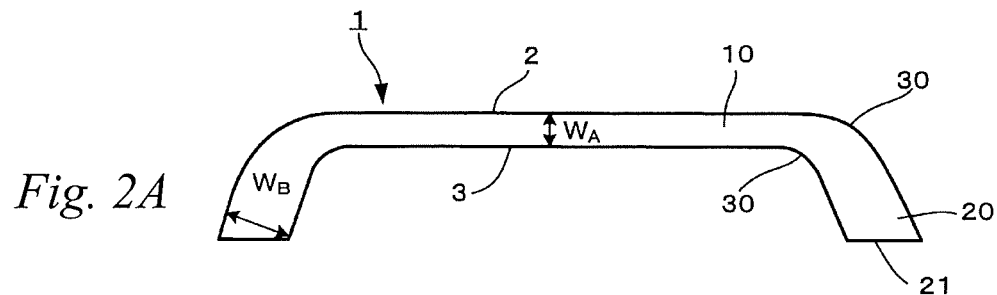
FIGS. 2A-2C show a chemically strengthened glass plate (s) according to the present invention.
Figure 2B:
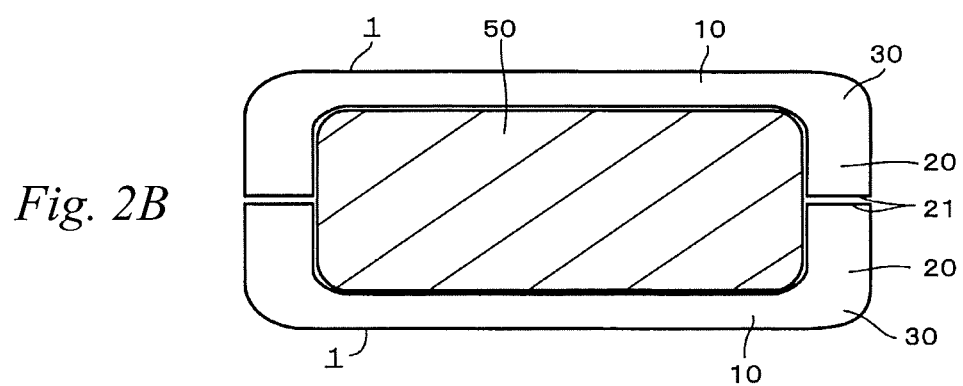
Figure 2C:
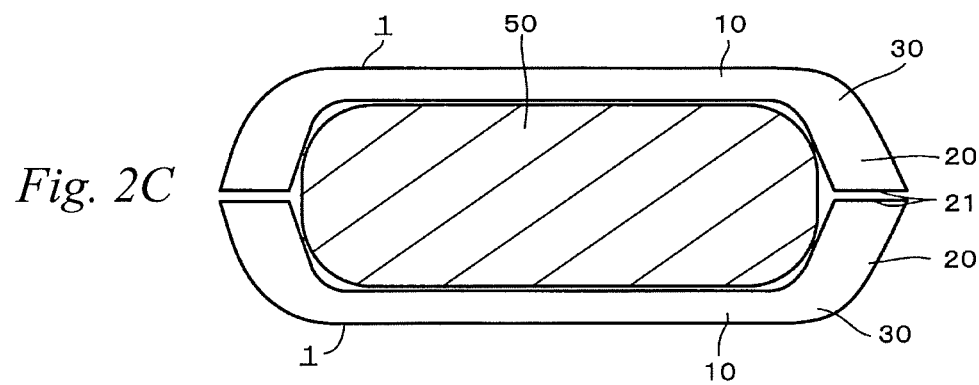

FIGS. 2A-2C are schematic sectional views of the glass plates 1 according to two embodiments. FIG. 2A is a schematic sectional view of a glass plate 1 according to a second embodiment taken by cutting the glass plate 1 by a plane that is parallel with one side of an approximately rectangular plan-view shape of the glass plate 1. In the second embodiment, the curved portion 30 of the first face 2 has a larger radius of curvature than in the first embodiment. And, as for the first face 2, the inclination of the second region 20 with respect to the flat face of the first region 10 is smaller than in the first embodiment. That is, whereas in the first embodiment the second region 20 extends perpendicularly to the formation direction (e.g., horizontal direction) of the first region 10, in the second embodiment the second region 20 extends in a direction that is inclined from the formation direction of the first region 10 by a prescribed angle. There are no particular limitations on the radii of curvature of the curved portions 30 and the inclination of the second region 20.

FIGS. 2B and 2C are schematic sectional views each showing a state that a portable information terminal 50 is sandwiched between two glass plates 1 according to the first embodiment (FIG. 2B) or the second embodiment (FIG. 2C). In the case where the end faces 21 of the two glass plates 1 are brought into contact with each other, a metal frame, for example, may be sandwiched between their contact surfaces.

FIGS. 3A-3E are schematic sectional views showing example glass plates 1 according to the second embodiment that are different from the one shown in FIG. 2A. In the glass plate 1 shown in FIG. 3A, in the first region 10 both of the first face 2 and the second face 3 have a curved shape. The second region 20 has a portion in which the thickness increases gradually as the position goes toward the end of the glass plate 1, and a maximum thickness $W_B$ occurs at a position shown in FIG. 3A. The glass plate 1 shown in FIG. 3A has an end face 21 (drawn as straight lines in FIG. 3A (sectional view)) that connects the first face 2 and the second face 3. In the glass plate 1 shown in FIG. 3A, the thickness around the end face 21 is smaller than the maximum thickness $W_B$.

Figure 3A:
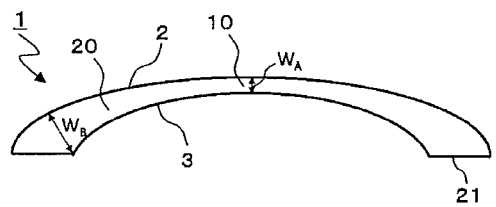
FIGS. 3A-3E are sectional views of other chemically strengthened glass plates according to the second embodiment.
Figure 3B:
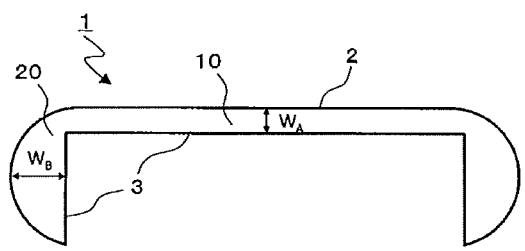

In the glass plate 1 shown in FIG. 3B, most of the first region 10 has a constant thickness $W_A$. The second region 20 has a portion in which the thickness increases gradually as the position goes toward its middle position, has a maximum thickness $W_B$ at a prescribed position shown in FIG. 3B, and the thickness decreases gradually as the position goes from the prescribed position toward the end of the first face 2. In the glass plate 1 shown in FIG. 3B, the first face 2 and the second face 3 are connected to each other and there is no end face 21.

Figure 3C:
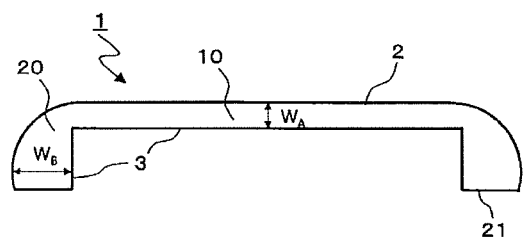

The glass plate 1 shown in FIG. 3C is a modified embodiment of the glass plate 1 shown in FIG. 3B. More specifically, in the glass plate 1 shown in FIG. 3C, most of the first region 10 has a constant thickness $W_A$. The second region 20 has a portion in which the thickness increases gradually as the position goes toward the end of the first face 2 of the glass plate 1, has a maximum thickness $W_B$ at a prescribed position shown in FIG. 3C, and the thickness is smaller than $W_B$ from the prescribed position to the end of the first face 2. The glass plate 1 shown in FIG. 3C also has an end face 21 (drawn as straight lines in FIG. 3C (sectional view)) that connects the first face 2 and the second face 3.

Figure 3D:
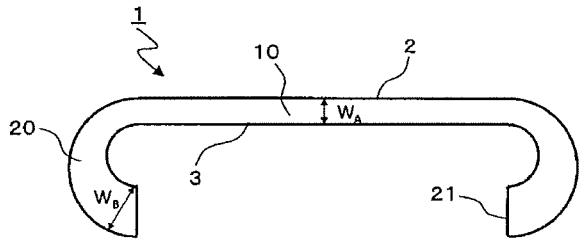

In the glass plate 1 shown in FIG. 3D, most of the first region 10 has a constant thickness $W_A$. The second region 20 has a portion in which the thickness increases gradually as the position goes toward the end of the first face 2 of the glass plate 1, has a maximum thickness $W_B$ at a prescribed position shown in FIG. 3D, and the thickness is smaller than $W_B$ from the prescribed position to the end of the first face 2. In the glass plate 1 shown in FIG. 3D, in particular, both of the first face 2 and the second face 3 are curved so as to assume a "J" shape in a cross section. The glass plate 1 shown in FIG. 3D also has an end face 21 (drawn as straight lines in FIG. 3D (sectional view)) that connects the first face 2 and the second face 3.

Figure 3E:
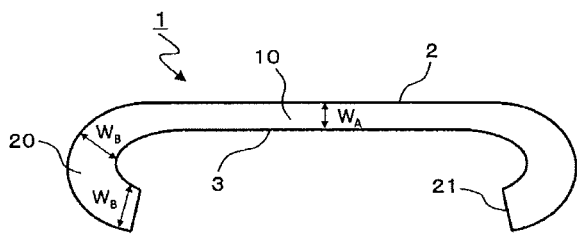

The glass plate 1 shown in FIG. 3E is a modified embodiment of the glass plate 1 shown in FIG. 3D. More specifically, in the glass plate 1 shown in FIG. 3E, most of the first region 10 has a constant thickness $W_A$. The second region 20 has a portion in which the thickness increases gradually as the position goes toward the end of the first face 2 of the glass plate 1, has a maximum thickness $W_B$ at a prescribed position shown in FIG. 3E, and the thickness is kept equal to $W_B$ from the prescribed position to the end of the first face 2. The glass plate 1 shown in FIG. 3D also has an end face 21 (drawn as straight lines in FIG. 3E (sectional view)) that connects the first face 2 and the second face 3.

Figure 4:
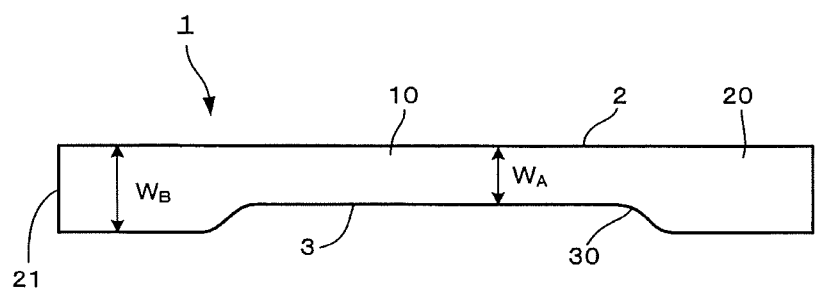
FIG. 4 is a sectional view of a chemically strengthened glass plate according to a third embodiment of the present invention.

FIG. 4 shows a glass plate 1 according to a third embodiment. In the glass plate 1 according to the third embodiment, the first face 2 is flat in the first region 10 and the second region 20. Furthermore, in the glass plate 1 according to the third embodiment, the thickness is larger in the entire second region 20 than in the first region 10 because of the shape of the second face 3. In the glass plate 1 according to the third embodiment, a curved portion 30 exists in the second face 3. The glass plate 1 shown in FIG. 4 also has end faces 21 (drawn as straight lines in FIG. 3E (sectional view)) that connect the first face 2 and the second face 3.

The glass plates 1 according to the embodiments can be made of any of various kinds of glass having respective compositions as long as they enable shaping and strengthening by chemically strengthening treatment. Examples of the glass materials include aluminosilicate glass, soda-lime glass, borosilicate glass, lead glass, alkali barium glass, and aluminoborosilicate glass.

Although there are no particular limitations on the composition of the glass plates 1, for example, the following composition may be mentioned. In terms of mole percentages based on the oxides, 50% to 80% of $SiO_2$, 2% to 25% of $Al_2O_3$, 0% to 20% of $Li_2O$, 0.1% to 18% of $Na_2O$, 0% to 10% of $K_2O$, 0% to 15% of MgO, 0% to 5% of CaO, 0% to 5% of $P_2O_5$, 0% to 5% of $B_2O_3$, 0% to 5% of $Y_2O_3$, and 0% to 5% of $ZrO_2$.

From the viewpoint of production efficiency, it is preferable that the glass plates 1 according to the embodiments contain lithium.

There are no particular limitations on the manufacturing method of the glass plates 1. For example, a glass plate to be subjected to necessary working, that is, a flat glass plate having an approximately uniform thickness, can be manufactured by putting a desired glass material into a continuous melting furnace, heat-melting the glass material preferably at 1,500° C. to 1,600° C., refining a molten glass, shaping a resulting glass by supplying it to a shaping machine, and cooling a shaped glass gradually.

The glass plates 1 according to the embodiments can be manufactured by working a flat-plate-like glass plate produced by any of various methods such as a down draw process (e.g., overflow down draw process, slot down process, or redraw process), a floating process, a roll-out process, and a press process. In the floating process, a flat-plate-like glass plate that is approximately uniform in thickness and width can be formed by allowing a molten glass raw material to float on a molten metal (e.g., tin) and performing a strict temperature control. In the embodiments, in order to form a glass plate 1 having a three-dimensional shape, a bend-shaping method can be employed in which a flat-plate-like glass plate is heated and bent utilizing a pressure difference in a state that a heated glass plate is set in contact with dies.

The glass plates 1 according to the embodiments can also be manufactured by a method in which a lump of glass rather than a flat-plate-like glass plate is heated and pressed using a set of dies (convex and concave dies). However, the shaping method is not limited to these methods. A glass plate is shaped by bending, cutting, die shaping, or the like and chemically strengthened after the shaping. However, there are no particular limitations on the shaping method and the order of steps.

Next, specific example manufacturing methods (Manufacturing method 1 to Manufacturing method 3) of a glass plate according to the embodiments will be described below with reference to the drawings.

<Manufacturing Method 1>

Figure 9A:
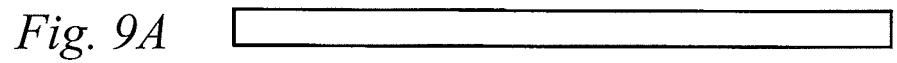
FIGS. 9A-9C are schematic views for description of an example manufacturing method for manufacturing a three-dimensional chemically strengthened glass plate according to the present invention.
Figure 9B:
Figure 9C:

FIGS. 9A-9C are schematic views for description of an example manufacturing method (Manufacturing method 1) for manufacturing a three-dimensional glass plate according to the embodiment. The steps shown in FIGS. 9A-9C are performed in this order.

FIG. 9A is a schematic sectional view of a flat glass plate having a constant thickness and is for description of a "step of preparing a flat glass plate." In this step, a flat glass plate having a prescribed plan-view shape (e.g., rectangle) and dimensions is prepared to manufacture a three-dimensional glass plate finally. There are no particular limitations on the constant thickness of the flat glass plate. For example, to manufacture a cover glass of a portable information terminal, a proper thickness range is 1.0 mm to 2.5 mm and it is preferable that the thickness is in a range of 1.3 mm to 2.0 mm.

FIG. 9B is a schematic sectional view of an uneven thickness glass plate for description of an "uneven thickness glass plate forming step" for giving in the prepared flat glass plate, a first region and a second region that is located around (outside) the first region and is thicker (maximum thickness $W_B$) than the first region. For example, this step is performed by forming the first region that is thinner than the portion around it (i.e., second region) using at least one of a method of grinding a portion to become the first region and a method of polishing a portion to become the first region.

For another example, this step is performed by forming an uneven thickness glass plate using shaping dies (not shown) having a convex die and a concave die. This step includes a "heat-shaping step" of shaping a flat glass plate by holding it between a convex die and a concave die and heating the shaping dies to a temperature (e.g., 900° C. to 950° C.) that is higher than or equal to a softening temperature of a glass material. Heating the flat glass plate preliminarily to a temperature that is lower than a glass transition temperature (e.g., 500° C.) before holding it between the convex die and the concave die is preferable because the temperature increase for the subsequent heating can be small and hence the probability of occurrence of damage such as a break can be lowered.

In the heat-shaping step, the thickness of the glass plate is made uneven by applying pressure to the dies in a state that the glass material is softened so as to produce a first region that is thinner than a second region. Furthermore, in this example, after the heat-shaping step, a "cooling step" is performed in which the shaped state is maintained and the shaping dies and the glass material are cooled to a temperature that is lower than the glass transition temperature. Thus, a prescribed uneven thickness glass plate is obtained.

FIG. 9C is a schematic sectional view of a three-dimensional glass plate according to the embodiment for description of a "bending step" of bending the uneven thickness glass plate using shaping dies (not shown) having a convex die and a concave die that correspond to an intended shape of the three-dimensional glass plate. The bending step includes a "heat-shaping step" of shaping the uneven thickness glass plate by holding it between the convex die and the concave die and heating the shaping dies to a temperature that is higher than or equal to a glass transition temperature of a glass material. The heat-shaping step forms a three-dimensional glass plate by applying pressure to the dies in a state that the glass material is softened.

In this example, after the heat-shaping step, a "cooling step" is performed in which the shaped state is maintained and the shaping dies and the glass material are cooled to a temperature that is lower than the glass transition temperature. Thus, an intended three-dimensional glass plate is obtained. The three-dimensional glass plate has a shape in which the extending direction of the first region and the extending direction of the second region are different from each other.

The bending step may further include a "surface working step" of changing the surface shape of the three-dimensional glass plate obtained by the cooling step to a desired shape. An example of the surface working step includes a step of performing "mechanical working" (CNC working) using a grindstone on a curved portion. In this step, precision working may be performed to obtain a desired radius of curvature. The surface working step may include a "polishing step" of polishing the surfaces. The order and the numbers of times of the mechanical working step and the polishing step may be set in desired manners.

For example, the above-mentioned polishing step can employ at least one of polishing methods of lapping, polishing, and etching to adjust the thickness of the first region to a prescribed value. The polishing step may be performed either on at least one of the first face 2 and the second face 3 of the first region or on only the first face 2 from the standpoint of the ease of polishing. Manufacturing method 1 includes a chemically strengthening treatment step (described later) to be performed later.

<Manufacturing Method 2>

Figure 10A:
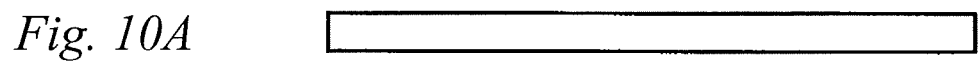
FIGS. 10A-10C are schematic views for description of another example manufacturing method for manufacturing a three-dimensional chemically strengthened glass plate according to the present invention.
Figure 10B:
Figure 10C:

FIGS. 10A-10C are schematic views for description of another example manufacturing method (Manufacturing method 2) for manufacturing a three-dimensional glass plate according to the embodiment. The steps shown in FIGS. 10A-10C are performed in this order.

FIG. 10A is a schematic sectional view of a flat glass plate having a constant thickness and is for description of a "step of preparing a flat glass plate." This step is the same as the "step of preparing a flat glass plate" of Manufacturing method 1 and hence a detailed description therefor is omitted here.

FIG. 10B is a schematic sectional view of a three-dimensional glass plate having a constant thickness for description of a "bending step" of bending the flat glass plate into the three-dimensional glass plate having the constant thickness using shaping dies (not shown) having a convex die and a concave die. The bending step includes a "heat-shaping step" of shaping the flat glass plate by holding it between the convex die and the concave die and heating the shaping dies to a temperature that is higher (by 100° C., for example) than or equal to a glass transition temperature of a glass material. As in Manufacturing method 1, the flat glass plate may be heated preliminarily to a temperature that is lower than a glass transition temperature before holding it between the convex die and the concave die. The heat-shaping step forms a three-dimensional glass plate having a constant thickness by applying pressure to the dies in a state that the glass material is softened.

After the heat-shaping step, a "cooling step" is performed in which the shaped state is maintained and the shaping dies and the glass material are cooled to a temperature that is lower than a glass transition temperature. Thus, a three-dimensional glass plate having a constant thickness is obtained. The three-dimensional glass plate having the constant thickness has a (virtual) first region and a (virtual) second region located outside the (virtual) first region that will become a first region and a second region, respectively, when an uneven thickness glass plate forming step which will be described later, is performed. Thus, the three-dimensional glass plate produced by performing the bending step has a shape in which the extending direction of the (virtual) first region and the extending direction of the (virtual) second region are different from each other. The broken line shown in FIG. 10B indicates a boundary line of a glass to be removed by the subsequent uneven thickness glass plate forming step.

FIG. 10C is a schematic sectional view of an uneven thickness three-dimensional glass plate for description of the uneven thickness glass plate forming step for reducing the thickness of a portion including the (virtual) first region of the three-dimensional glass plate having the constant thickness. An example of the uneven thickness glass plate forming step includes a step of performing "mechanical working" (CNC working) using a grindstone so as to reduce the thickness of a portion including the (virtual) first region of the thus-obtained three-dimensional glass plate having the constant thickness. The uneven thickness glass plate forming step may include a "polishing step" of polishing surfaces, and the order and the numbers of times of the mechanical working step and the polishing step may be set in desired manners.

For example, the above-mentioned polishing step can employ at least one of polishing methods of lapping, polishing, and etching to adjust the thickness of the portion including the (virtual) first region to a prescribed value. The polishing step may be performed either on at least one of the first face 2 and the second face 3 of the portion including the (virtual) first region or on only the first face 2 from the standpoint of the ease of polishing. Manufacturing method 2 includes a chemically strengthening treatment step (described later) to be performed later.

<Manufacturing Method 3>

Figure 11A:
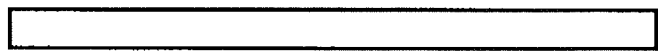
FIGS. 11A and 11B are schematic views for description of a further example manufacturing method for manufacturing a three-dimensional chemically strengthened glass plate according to the present invention.
Figure 11B:
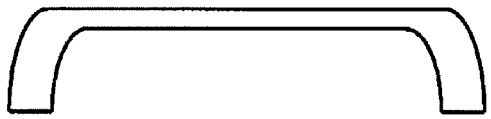

FIGS. 11A and 11B are schematic views for description of a further example manufacturing method (Manufacturing method 3) for manufacturing a three-dimensional glass plate according to the embodiment. The steps shown in FIGS. 11A and 11B are performed in this order.

FIG. 11A is a schematic sectional view of a flat glass plate having a constant thickness and is for description of a "step of preparing a flat glass plate." This step is the same as the "step of preparing a flat glass plate" of Manufacturing method 1 and hence a detailed description therefor is omitted here.

FIG. 11B is a schematic sectional view of an uneven thickness three-dimensional glass plate for description of a "uneven-thickness bent glass plate forming step" of bending the flat glass plate into an uneven thickness three-dimensional glass plate using shaping dies (not shown) having a convex die and a concave die. This step includes a "heat-shaping step" of shaping the flat glass plate by holding it between the convex die and the concave die and heating the shaping dies to a temperature that is higher than or equal to a softening temperature of a glass material. The heat-shaping step forms an uneven thickness three-dimensional glass plate by applying pressure to the dies in a state that the glass material is softened.

In the uneven-thickness bent glass plate forming step, after the heat-shaping step, a "cooling step" is performed in which the shaped state is maintained and the shaping dies and the glass material are cooled to a temperature that is lower than a glass transition temperature. Thus, an uneven thickness three-dimensional glass plate is obtained. The uneven thickness three-dimensional glass plate has a first region and a second region located outside the first region and has a shape in which the extending direction of the first region and the extending direction of the second region are different from each other.

As in the above-described Manufacturing method 1, the uneven-thickness bent glass plate forming step may further include a "surface working step" of performing precision working to change the surface shape of the uneven thickness three-dimensional glass plate into a desired shape. The surface working step may include at least one of a "mechanical working step" and a "polishing step." The order and the numbers of times of the mechanical working step and the polishing step may be set in desired manners. Manufacturing method 3 includes a chemically strengthening treatment step (described later) to be performed later.

<Chemically Strengthening Treatment Step>

The glass plate 1 is a chemically strengthened glass plate which is a glass plate whose surface has a compressive stress layer formed by ion exchange. For example, chemically strengthening treatment is used in which a glass plate is brought into contact with a solution of a metal salt (e.g., potassium nitrate) containing a metal ion having a large ion diameter (e.g., K ion) at a temperature that is lower than or equal to a glass transition temperature. In the chemically strengthening treatment step, ion exchange occurs on the surface of a three-dimensional glass plate, whereby chemically strengthening proceeds. For example, a compressive stress layer is formed adjacent to the glass surface by replacing an alkali metal ion having a small ion radius (e.g., Li ion and/or Na ion) in the glass plate with another alkali metal ion having a larger ion radius (e.g., Na ion and/or K ion).

In the glass plate 1 according to the embodiment, for example, a three-dimensional glass plate containing lithium is brought into contact with an inorganic salt composition containing at least one of a nitrate and a sulfate. A deep compressive stress layer can be formed by adding the step of ion-exchanging Li ions contained in the three-dimensional glass plate with ions contained in the inorganic salt composition and having a larger ion radius than Li ions. Since the inorganic salt composition is used in a dissolved state, in this specification it may be referred to simply as a "molten salt"; these terms will be used as having the same meaning.

The inorganic salt composition contains at least one of a nitrate and a sulfate. Examples of the nitrate include sodium nitrate and potassium nitrate, and examples of the sulfate include sodium sulfate and potassium sulfate.

The inorganic salt composition may contain other components as long as they do not impair the effect of the present invention. Examples of the other components include sodium chloride, sodium borate, potassium chloride, potassium borate, potassium carbonate, sodium carbonate, and sodium bicarbonate. These salts may be added singly or in combination thereof.

Examples of the method for bringing a glass into contact with the inorganic salt composition include a method of applying an inorganic salt composition in paste form to the glass, a method of spraying an aqueous solution of the inorganic salt composition onto the glass, and a method of immersing the glass into a molten salt bath of the inorganic salt composition heated to a temperature that is higher than or equal to a melting temperature. Among these methods, the method of immersing the glass into a molten salt of the inorganic salt composition is preferable.

For example, the chemically strengthening treatment of immersing the glass into a molten salt is performed according to the following procedure. First, the glass is preheated and the temperature of the molten salt is adjusted to a temperature at which the chemically strengthening treatment is to be performed. Subsequently, the preheated glass is immersed in the molten salt for a prescribed time, lifted up from the molten salt, and allowed to cool. Although the glass preheating temperature depends on the temperature of the chemically strengthening treatment, in general, it is preferable that the glass preheating temperature is higher than or equal to 100° C. The chemically strengthening treatment should be performed at least one time; it may be performed two or more times under different sets of conditions.

It is preferable that the temperature at which the chemically strengthening treatment is performed is lower than or equal to a strain point (usually 500° C. to 600° C.) of a glass to be strengthened. To obtain a compressive stress layer having a larger depth of layer (DOL), it is particularly preferable that the chemically strengthening treatment is performed at a temperature that is higher than or equal to 350° C. A temperature higher than or equal to 380° C. is even preferable and a temperature higher than or equal to 400° C. is further preferable.

From the standpoint of suppressing deterioration and decomposition of the molten salt, it is preferable that the chemically strengthening treatment is performed at a temperature that is lower than or equal to 500° C. A temperature lower than or equal to 480° C. is even preferable and a temperature lower than or equal to 450° C. is further preferable. As for the time during which to perform the chemically strengthening treatment, it is preferable that the time of contact of the glass to the inorganic salt composition is 1 hour to 24 hours. An even preferable time range is 2 hours to 20 hours.

Figure 5A:
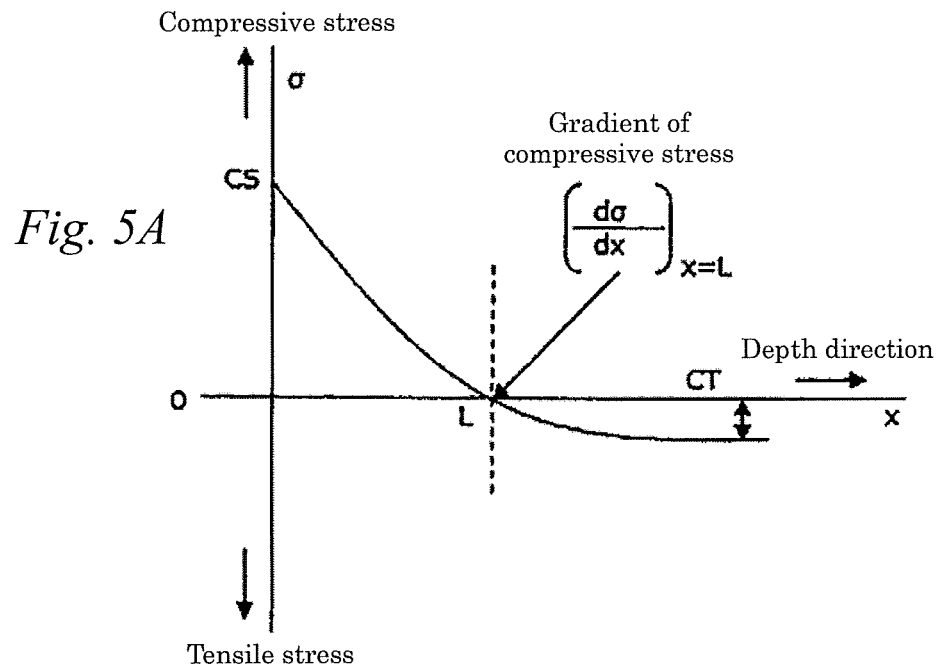
FIGS. 5A and 5B are graphs each showing a relation between the depth of a compressive stress layer and the compressive stress/tensile stress of a chemically strengthened glass plate in the cross section thereof.
Figure 5B:
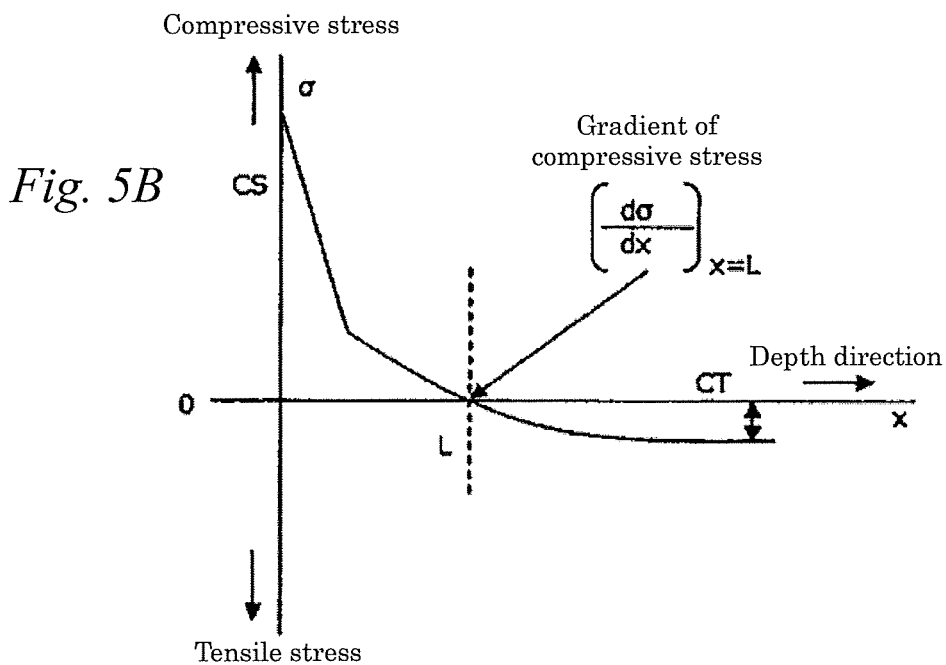

The relation between the compressive stress/tensile stress and the depth of the compressive stress layer of the glass plate 1 according to the embodiment is represented by a graph as shown in FIGS. 5A and 5B in which the horizontal axis represents the glass thickness and the vertical axis represents the compressive stress or tensile stress. FIG. 5A is a graph showing a stress profile with respect to the thickness of the glass plate 1 subjected to chemically strengthening treatment one time. FIG. 5B is a graph showing a stress profile with respect to the thickness of the glass plate 1 subjected to chemically strengthening treatment two times under different sets of conditions.

As shown in FIGS. 5A and 5B, a compressive stress layer is formed in the glass plate 1 at least on the side of the first face 2 to be touched by a user finger and tensile stress occurs inside the glass plate 1. Thus, the depth from the glass surface (the first face 2) is represented by x (μm) and the compressive stress value at the depth x is represented by σ. The depth from the glass surface at which the compressive stress value σ is equal to 0 is represented by a compressive stress depth L (μm). Additionally, an inside tensile stress is represented by CT (for "center tension"; unit: MPa) and a compressive stress value σ at the glass surface is represented by CS (for "compressive stress"; unit: MPa).

In the glass plate 1 according to the embodiment, a compressive stress layer develops from the first face 2 in the depth direction. The second region 20 has a portion where the depth $L_B$ of the compressive stress layer is larger than the depth $L_A$ of the compressive stress layer in the first region 10, whereby the strength of the second region 20 is increased. In the second region 20, a compressive stress layer may be formed in a depth direction from not only the first face 2 but also the second face 3 or the end face 21. However, the depth $L_B$ of the compressive stress layer in the second region 20 means the depth from the first face 2 unless otherwise specified.

In this specification, the parameter $[d\sigma/dx]_{x=L}$ (MPa/μm) means the gradient of a curve of the compressive stress value σ at the depth L of the compressive stress layer. When the gradient $[d\sigma/dx]_{x=L}$ is small, the depth L of the compressive stress layer varies to a large extent with respect to a variation of the thickness of the glass plate 1.

In the glass plate 1 according to the embodiment, it is preferable that the gradient $[d\sigma/dx]_{x=L}$ of the curve of the compressive stress value σ with respect to the depth from the surface is larger than or equal to −2 (i.e., $[d\sigma/dx]_{x=L} \geq -2$), in which case the compressive stress layer is deep and the glass plate 1 is given large impact resistance. The gradient $[d\sigma/dx]_{x=L}$ being larger than or equal to −1 is even preferable and the gradient $[d\sigma/dx]_{x=L}$ being larger than or equal to −0.5 is further preferable. It is noted that the gradient $[d\sigma/dx]x-L$ has a negative value.

In the case where the glass plate 1 is used as, for example, the cover glass of a portable information terminal 50, the glass plate 1 may be damaged due to a drop of the portable information terminal 50, external impact, or the like. In that event, the second region 20 of the glass plate 1 is prone to receive stronger impact than first region 10 and hence to be damaged originating from the second region 20. In the glass plate 1 according to the embodiment, the degree of damage can be lowered because the chemical strengthening level is high in the second region 20.

In the glass plate 1 according to the embodiment, the depth $L_B$ of the compressive stress layer can be made larger than the depth $L_A$ of the compressive stress layer ($L_B > L_A$) even in the case where the second region 20 is thicker than the first region 10 ($W_B > W_A$). In the glass plate 1 according to the embodiment, the entire glass plate 1 is strengthened and, in particular, the depth $L_B$ of the compressive stress layer of the second region 20 can be made large, as a result of which the impact resistance can be made high in a peripheral portion of the glass plate 1. Thus, the glass plate 1 is resistant to a drop and impact and hence is suitable for use as, for example, a cover glass of a portable information terminal 50.

In the glass plate 1 according to the embodiment, the depth $L_A$ of the compressive stress layer from the first face 2 at a position in the first region 10 having a thickness $W_A$ and the depth $L_B$ of the compressive stress layer from the first face 2 at a position in the second region 20 having a thickness $W_B$ are larger than or equal to 80 μm and satisfy a relation $L_B/L_A \geq 1.2$. The depths $L_A$ and $L_B$ being larger than 90 μm is preferable, and the depths $L_A$ and $L_B$ being larger than 100 μm is even preferable.

In a case where the relation $L_B/L_A \geq 1.2$ is satisfied, since the compressive stress layer is deeper in the second region 20 than in the first region 10, the strength of the second region 20 is more improved to be less prone to break. The ratio $L_B/L_A$ being larger than or equal to 1.3 is preferable, and the ratio $L_B/L_A$ being larger than or equal to 1.4 is even preferable. Although there are no particular limitations on the upper limit of the ratio $L_B/L_A$, the ratio $L_B/L_A$ being smaller than or equal to 3 is a typically preferable range, and the ratio $L_B/L_A$ being smaller than or equal to 2 is even preferable.

In the glass plate 1 according to the embodiment, it is preferable that the tensile stress $CT_A$ at a position in the first region 10 having a thickness $W_A$ and the tensile stress $CT_B$ at a position in the second region 20 having a thickness $W_B$ satisfy a relation $|CT_A| > |CT_B|$. In the case where the relation $|CT_A| > |CT_B|$ is satisfied, the tensile stress which may cause a crack is smaller in the second region 20 than in the first region 10 and hence the degree of damage caused by impact or the like can be lowered.

In the glass plate 1 according to the embodiment, it is preferable that the depth $L_A$ of the compressive stress layer in the first region 10 and the thickness $W_A$ of the first region 10 satisfy a relation $L_A/W_A \geq 0.15$. The depth $L_A$ and the thickness $W_A$ satisfying a relation $L_A/W_A \geq 0.17$ is even preferable, and the depth $L_A$ and the thickness $W_A$ satisfying a relation $L_A/W_A \geq 0.19$ is further preferable. In the case where the relation $L_A/W_A \geq 0.15$ is satisfied, the impact resistance can be made high. Although there are no particular limitations on the upper limit of the ratio $L_A/W_A$, a typical upper limit of $L_A/W_A$ is 0.25.

Figure 6A:
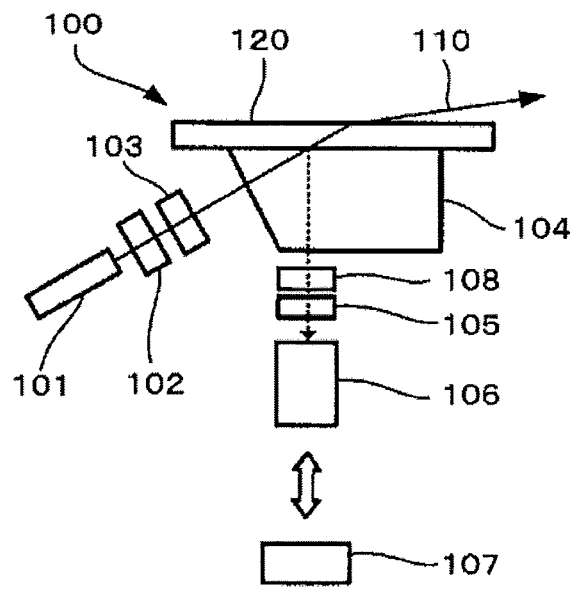
FIGS. 6A-6C show a stress measuring instrument for measuring compressive stress and a depth of a compressive stress layer.

A compressive stress at the glass surface (CS) and a depth of a compressive stress layer (DOL) can be measured by a stress measuring instrument such as a scattered light photoelastic stress meter. The principle of operation of a scattered light photoelastic stress meter (type name SLP-1000 manufactured by Orihara Industrial Co., Ltd) which was used in Examples (described later) as a stress measuring instrument 100 will be described with reference to FIGS. 6A-6C.

The stress measuring instrument 100 includes a laser light source 101, a polarizing member 102, a polarized light phase difference varying member 103, a light supply member 104, a light conversion member 105, an imaging device 106, a computation member 107, and a light wavelength selection member 108. A measurement target body 120 which is a glass plate to be measured is mounted on the light supply member 104 and is measured by irradiating laser light 110 emitted from the laser light source 101 on the measurement target body 120. The polarized light phase difference varying member 103 varies the polarized light phase difference of the laser light 110 by more than or equal to one wavelength of the laser light 110.

The imaging device 106 images scattered light of polarized-light-phase-difference-varied laser light 110 incident on the measurement target body 120 plural times at a prescribed time interval and thereby acquires plural images. The computation member 107 includes a computation unit 140 (not shown) and the computation unit 140 measures a periodic luminance variation of the scattered light using the plural images, calculates a phase variation of the luminance variation, and calculates a stress profile of the measurement target body 120 in the depth direction from its surface on the basis of the calculated phase variation.

Figure 6B:
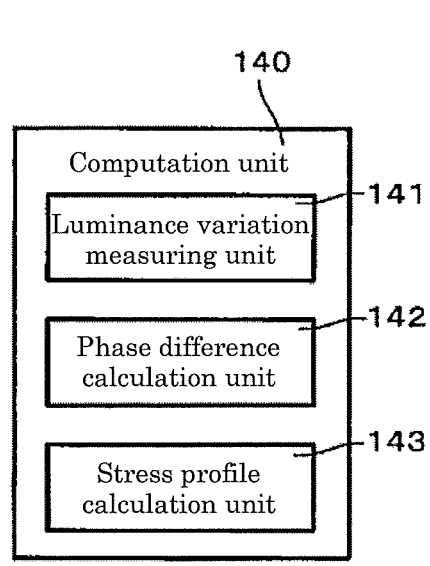
Figure 6C:
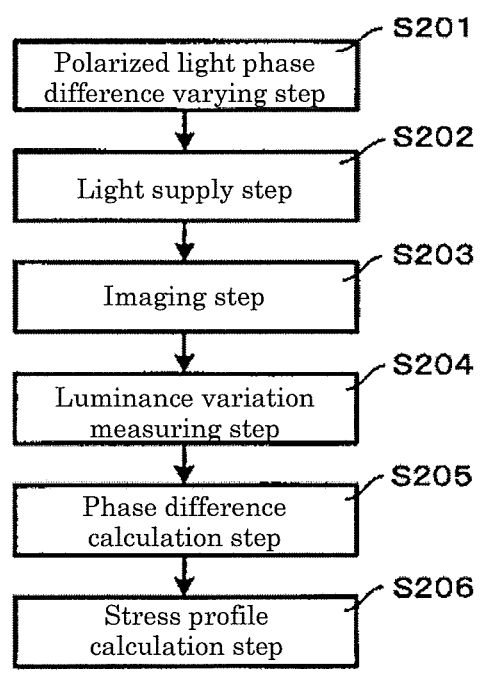

As shown in FIG. 6B, the computation unit 140 includes a luminance variation measuring unit 141, a phase difference calculation unit 142, and a stress profile calculation unit 143.

The stress measuring instrument 100 performs a measurement according to the following process (FIG. 6C):

(1) A polarized light phase difference varying step of varying the polarized light phase difference of laser light 110 by the polarized light phase difference varying member 103 (step S201);

(2) A light supply step of supplying the laser light 110 to the measurement target body 120 by the light supply member 104 (step S202);

(3) An imaging step of imaging scattered light coming from the measurement target body 120 by the imaging device 106 (step S203);

(4) A luminance variation measuring step of measuring a periodic luminance variation of the imaged scattered light by the computation member 107 (step S204);

(5) A phase difference calculation step of calculating a phase difference by the computation member 107 (step S205); and (6) A stress profile calculation step of calculating a stress profile by the computation member 107 (step S206).

EXAMPLES

Figure 7:
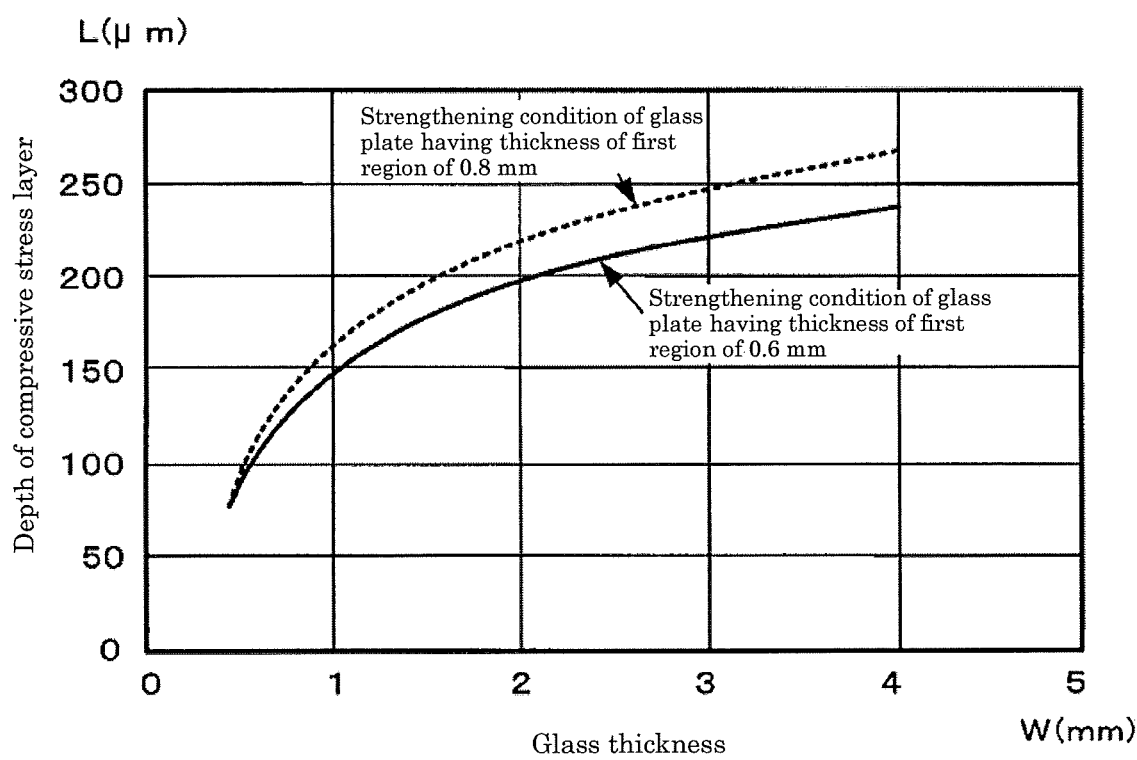
FIG. 7 is a graph showing a relation between the depth of a compressive stress layer and the thickness of a chemically strengthened glass plate.
Figure 8:
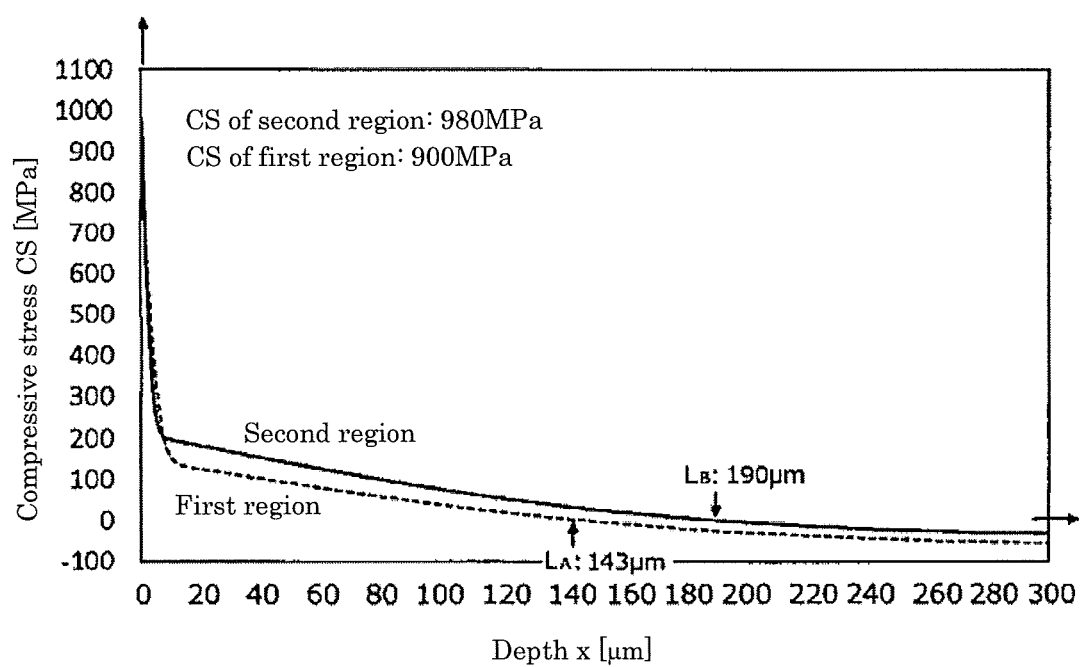
FIG. 8 is a graph showing a relation between the compressive stress CS and the position in the depth direction in each of a first region and a second region of a chemically strengthened glass plate according to the present invention.

Advantages of the glass plate 1 according to the embodiment will be described on the basis of sets of trial manufacture conditions (Table 1), sets of measurement results (Table 2), and a relation between the depth of a compressive stress layer and the plate thickness (FIG. 7). In Table 1, the mark "-" indicates that the glass plate 1 was not subjected to second-stage chemically strengthening treatment. Furthermore, a graph for comparison between the first region 10 and the second region 20 with respect to the CS value and the DOL value was produced for Example 4 (FIG. 8).

Examples 1-8

In Examples 1-8, samples were produced by performing chemically strengthening treatment on a glass plate containing $Li_2O$, $Al_2O_3$, and $SiO_2$ (denoted by "LiAlSi" in Table 2) under sets of conditions shown in Table 1, respectively. More specifically, in Examples 1-8 and Comparative Examples 1-3, as shown in FIG. 1A, an original glass plate was bent so that the extending direction of the second region 20 was approximately perpendicular to the extending direction of the first region 10 to form a glass plate 1 having an end face 21 that was approximately parallel with the second face 3 of the first region 10. The glass plate 1 as shown in FIG. 1A was produced so that the horizontal width (thickness) of a vertically extending portion of the second region 20 was approximately constant. As shown in Table 2, in Examples 1-3, the thickness $W_A$ of the first region 10 was 0.6 mm and the thickness $W_B$ of the second region 20 was 1.2 mm to 1.6 mm. In Examples 4-8, the thickness $W_A$ of the first region 10 was 0.8 mm and the thickness $W_B$ of the second region 20 was 1.2 mm to 2.0 mm. In table 2, values of all of the depth L of a compressive stress layer, the gradient of a curve of the compressive stress value σ, and CS, CT, and DOL (of the first region 10) were of the first face 2.

In Examples 1-8 and Comparative Examples 1-3 (described later), chemically strengthened glass plates were produced by Manufacturing method 2. Uneven thickness three-dimensional glass plates before being subjected to chemically strengthening treatment were produced by the following method.

(1) Step of Preparing a Flat Glass Plate

Flat glass plates having constant thicknesses 0.7 mm, 1.2 mm, 1.4 mm, 1.6 mm, and 2.0 mm were prepared by a floating process. The glass material was DT-STAR (transition temperature: 549° C.; strain point: 508° C.) manufactured by AGC Inc.

(2) Uneven-Thickness Bent Glass Plate Forming Step

Each flat glass plate thus prepared was held between a convex die and a concave die having external dimensions 180 mm×120 mm×30 mm and approximately the same volume, and the temperature of the dies was increased until the glass viscosity coefficient became $10^{9.5}$ (Pa·s). Then the glass was shaped by pressurizing it with a maximum pressure of 0.55 MPa with the die temperature maintained. Then the dies were cooled to a glass strain point in a state that the glass was pressurized with a maximum pressure of 0.5 MPa, and were allowed to cool to normal temperature.

A resulting three-dimensional glass plate was approximately shaped like a rectangle measuring 150 mm×80 mm in a plan view (as viewed from the normal direction to the surface of the first region 10), and the radius of curvature of the curved portion 30 of the surface (first face 2) was 5 mm along the entire circumference of the first region 10. A central portion of the surface (first face 2 of the first region 10) of the three-dimensional glass plate had a flat portion whose radius of curvature was longer than 100 mm, and the bending depth (i.e., the length from the first face 2 of the first region 10 to the end face) was about 3.2 mm.

(3) Surface Working Step

Finally, the above-mentioned flat portion of each three-dimensional glass plate that were allowed to cool to normal temperature was ground by CNC working to remove a portion having a prescribed thickness and polished so that the second region 20 had a prescribed curved shape. Then all the surfaces, that is, the first face 2, the second face 3, and the end face 21, of a resulting three-dimensional glass plate were polished using a cerium oxide abrasive to smooth the surfaces. The thicknesses of the respective regions of each of the three-dimensional glass plates of Examples 1-8 and Comparative Examples 1-3 are shown in Table 2.

As shown in Table 1, as for the conditions of the chemically strengthening treatment, in Example 1, at the first stage, the glass plate was immersed in a molten salt of $NaNO_3$ (100%) at 450° C. for 2.5 hours. At the second stage, the glass plate was immersed in a molten salt of $KNO_3$ (100%) at 415° C. for 2 hours. The conditions of each of Examples 2 and 3 were the same as those of Example 1. In Example 4, whereas the conditions of the first stage were the same as in Example 1, at the second stage the glass plate was immersed in a molten salt of $KNO_3$ (100%) at 425° C. for 1.5 hours. The conditions of each of Examples 5, 6, and 8 were the same as those of Example 4. The conditions of Example 7 were the same as those of Example 4 except that at the first stage the immersion time was 20 hours.

Comparative Example 1

In Comparative Example 1, a sample was produced by performing chemically strengthening treatment on a glass plate containing $Al_2O_3$ and $SiO_2$ (denoted by AlSi in Table 2) under the conditions shown in Table 1. As shown in Table 2, the thickness $W_A$ of the first region 10 of Comparative Example 1 was 0.6 mm and the thickness $W_B$ of the second region 20 was 1.2 mm. As shown in Table 1, as for the chemically strengthening treatment conditions of Comparative Example 1, the glass plate was immersed in a mixed molten salt of $KNO_3$ (97 wt %) and $NaNO_3$ (3 wt %) at 435° C. for 4.5 hours. No second-stage chemically strengthening treatment was performed.

Comparative Example 2

In Comparative Example 2, a sample was produced by performing chemically strengthening treatment on a glass plate containing $Li_2O$, $Al_2O_3$ and $SiO_2$ under the conditions shown in Table 1. As shown in Table 2, the thickness $W_A$ of the first region 10 of Comparative Example 2 was 0.6 mm and the thickness $W_B$ of the second region 20 was 1.2 mm. As shown in Table 1, in Comparative Example 2, the glass plate was immersed in a molten salt of $KNO_3$ (100%) at 410° C. for 73 hours. No second-stage chemically strengthening treatment was performed.

Comparative Example 3

In Comparative Example 3, a sample was produced by performing chemically strengthening treatment on a glass plate containing $Li_2O$, $Al_2O_3$ and $SiO_2$ under the conditions shown in Table 1. As shown in Table 2, the thickness $W_A$ of the first region 10 of Comparative Example 3 was 0.6 mm and the thickness $W_B$ of the second region 20 was 0.7 mm. As shown in Table 1, as for the chemically strengthening treatment conditions of Comparative Example 3, the glass plate was immersed in a molten salt of $NaNO_3$ (100%) at 450° C. for 2.5 hours (first stage) and then immersed in a molten salt of $KNO_3$ (100%) at 415° C. for 2 hours (second stage).

Compressive stress CS, Tensile stress CT, a compressive stress layer depth L, and compressive stress value σ were measured and a gradient $[d\sigma/dx]_{x=L}$ was calculated for each of the samples of Examples and Comparative Examples produced under the above-described sets of conditions using the scattered light photoelastic stress meter (type name SLP-1000 manufactured by Orihara Industrial Co., Ltd), a surface stress meter (type name FSM-6000 manufactured by Orihara Industrial Co., Ltd), or a double refraction imaging system (type name Abrio-IM manufactured by Tokyo Instruments, Inc.).

Results are shown in Table 2 and FIGS. 7 and 8. FIG. 7 is a graph in which the horizontal axis represents the glass thickness and the vertical axis represents the depth of a compressive stress layer, and shows a relation between the glass thickness and the depth of a compressive stress layer when the glass thickness was varied under the same chemically strengthening treatment conditions as optimum ones for a glass plate having a prescribed thickness. In FIG. 7, the solid-line curve represents a relation of a case that the optimum chemically strengthening treatment conditions were for a glass plate having a thickness 0.6 mm and the broken-line curve represents a relation of a case that the optimum chemically strengthening treatment conditions were for a glass plate having a thickness 0.8 mm.

In Example 4, CS, CT, and DOL of the second portion 20 were 980 MPa, 40 MPa, and 190 μm, respectively. Incidentally, the values of CS, CT, and DOL of the second portion 20 is values at the first face 2. FIG. 7 is a graph showing a relation between the depth of the compressive stress layer and the thickness of the second region 20. FIG. 8 is a graph showing a relation between the position in the depth direction and the compressive stress CS in each of the first region 10 and the second region 20 of Example 4.

As seen from Table 2 and FIG. 8, the depth L of the compressive stress layer was made larger in Example 4 and the depth L of the compressive stress layer was kept large certainly even if the thickness W was increased. Even in the case where the second region 20 was thicker than the first region 10, the depth L of the compressive stress layer of the second region 20 was made large. It seems that this results from the fact that the first region 10 and the second region 20 were subjected to chemically strengthening treatment at the same time under the same conditions. It is seen that the depth $L_A$ of the compressive stress layer of the first region 10 and the depth $L_B$ of the compressive stress layer of the second region 20 satisfy a relation $L_B/L_A \geq 1.2$.

TABLE 1

|  | First stage chemically strengthening treatment | | | Second stage chemically strengthening treatment | | |
|---|---|---|---|---|---|---|
|  | Temp. (° C.) | Time (hr) | Inorganic salt composition | Temp. (° C.) | Time (hr) | Inorganic salt composition |
| Ex. 1 | 450 | 2.5 | NaNO$_3$ 100% | 415 | 2.0 | KNO$_3$ 100%, |
| Ex. 2 | 450 | 2.5 | NaNO$_3$ 100% | 415 | 2.0 | KNO$_3$ 100% |
| Ex. 3 | 450 | 2.5 | NaNO$_3$ 100% | 415 | 2.0 | KNO$_3$ 100% |
| Ex. 4 | 450 | 2.5 | NaNO$_3$ 100% | 425 | 1.5 | KNO$_3$ 100% |
| Ex. 5 | 450 | 2.5 | NaNO$_3$ 100% | 425 | 1.5 | KNO$_3$ 100% |
| Ex. 6 | 450 | 2.5 | NaNO$_3$ 100% | 425 | 1.5 | KNO$_3$ 100% |
| Ex. 7 | 450 | 20.0 | NaNO$_3$ 100% | 425 | 1.5 | KNO$_3$ 100% |
| Ex. 8 | 450 | 2.5 | NaNO$_3$ 100% | 425 | 1.5 | KNO$_3$ 100% |
| Comp. Ex. 1 | 435 | 4.5 | KNO$_3$ 97%, NaNO$_3$ 3% | — | — | — |
| Comp. Ex. 2 | 410 | 73.0 | KNO$_3$ 100%, | — | — | — |
| Comp. Ex. 3 | 450 | 2.5 | NaNO$_3$ 100% | 415 | 2.0 | KNO$_3$ 100% |

TABLE 2

|  |  | Thickness W | | | Depth L of Compressive stress layer | | |  | Gradient $[d\sigma/dx]_{x=L}$ | | First region | | |
|---|---|---|---|---|---|---|---|---|---|---|---|---|---|
|  |  | First region | Second region |  | First region | Second region |  |  | First region | Second region | | | |
|  | Glass | $W_A$ (mm) | $W_B$ (mm) | Ratio-1 $W_B/W_A$ | $L_A$ (μm) | $L_B$ (μm) | Ratio-2 $L_B/L_A$ | La/Wa | gradient$_A$ (MPa/μm) | gradient$_B$ (MPa/μm) | CS (MPa) | CT (MPa) | DOL (μm) |
| Ex. 1 | LiAlSi | 0.6 | 1.2 | 2.00 | 112 | 165 | 1.47 | 0.19 | −0.8 | −0.5 | 918 | 64 | 112 |
| Ex. 2 | LiAlSi | 0.6 | 1.4 | 2.33 | 112 | 175 | 1.56 | 0.19 | −0.8 | −0.4 | 918 | 64 | 112 |
| Ex. 3 | LiAlSi | 0.6 | 1.6 | 2.67 | 112 | 184 | 1.64 | 0.19 | −0.8 | −0.4 | 918 | 64 | 112 |
| Ex. 4 | LiAlSi | 0.8 | 1.4 | 1.75 | 143 | 190 | 1.33 | 0.18 | −0.7 | −0.5 | 900 | 61 | 143 |
| Ex. 5 | LiAlSi | 0.8 | 1.6 | 2.00 | 143 | 201 | 1.40 | 0.18 | −0.7 | −0.4 | 900 | 61 | 143 |
| Ex. 6 | LiAlSi | 0.8 | 2.0 | 2.50 | 143 | 217 | 1.52 | 0.18 | −0.7 | −0.3 | 900 | 61 | 143 |
| Ex. 7 | LiAlSi | 0.8 | 2.0 | 2.50 | 175 | 331 | 1.89 | 0.22 | −0.7 | −0.3 | 732 | 109 | 175 |
| Ex. 8 | LiAlSi | 0.8 | 1.2 | 1.50 | 143 | 178 | 1.24 | 0.18 | −0.7 | −0.5 | 900 | 61 | 143 |
| Comp. Ex. 1 | AlSi | 0.6 | 1.2 | 2.00 | 31 | 32 | 1.04 | 0.05 | −15.3 | −14.6 | 890 | 51 | 31 |
| Comp. Ex. 2 | LiAlSi | 0.6 | 1.2 | 2.00 | 23 | 24 | 1.02 | 0.04 | −31.3 | −26.5 | 764 | 32 | 23 |
| Comp. Ex. 3 | LiAlSi | 0.6 | 0.7 | 1.17 | 112 | 124 | 1.11 | 0.19 | −0.8 | −0.7 | 918 | 64 | 112 |

Since the compressive stress layer of the second region 20 is deeper than that of the first region 10 and the relation $L_B/L_A \geq 1.2$ is satisfied, the strength of the second region 20 is increased to be less prone to break. The strength of each glass plate was evaluated to produce results that the glass plates of Examples were stronger than those of Comparative Examples and, in particular, were reduced in the probability of occurrence of a break that originates from an end or an end face.

As shown in FIG. 7, it is seen that in the first region 10 the compressive stress layer becomes deeper as the thickness W increases. In the case where the thickness $W_A$ of the first region 10 is not much different from the thickness $W_B$ of the second region 20 as in Comparative Example 3 (the ratio-1 is equal to 1.17), the difference between the depths $L_A$ and $L_B$ of the compressive stress layers is small (the ratio-2 is equal to 1.11). However, in the case where the ratio-1 ($W_B/W_A$) is larger than 1.5 as in Examples 1-8, the ratio-2 ($L_B/L_A$) between the depths $L_B$ and $L_A$ of the compressive stress layers becomes large and the strength of the glass plate 1 is more improved.

It is seen from Table 2 that when the gradient $[d\sigma/dx]_{x=L}$ of the compressive stress is gentle, that is, $[d\sigma/dx]_{x=L} \geq -2$, as in Examples 1-8, the depth L of the compressive stress layer becomes larger and the glass plate 1 is increased in impact resistance and hence made stronger.

The invention is not limited to the above embodiments and various modifications, improvements, etc. are possible. The materials, shapes, dimensions, sets of numerical values, forms, numbers, locations, etc. of the respective constituent elements of each of the above embodiments are not limited to those disclosed but can be determined in desired manners as long as the invention can be implemented.

The present application is based on Japanese patent application No. 2018-087712 filed on Apr. 27, 2018, and Japanese patent application No. 2018-150379 filed on Aug. 9, 2018, and the contents of which are incorporated herein by reference.

The chemically strengthened glass plate and the manufacturing method thereof according to the present invention is suitable for use in fields of portable information terminals, substrates, etc. in which glass plates having high resistance to impact are required.

DESCRIPTION OF REFERENCE NUMERALS AND SIGNS

1: Glass plate
2: First face
3: Second face
10: First region
20: Second region
21: End face
30: Curved portion
CT: Tensile stress
CS: Compressive stress
L: Depth of compressive stress layer
W: Thickness
σ: Compressive stress value

What is claimed is:

1. A chemically strengthened glass plate comprising:
a first face;
a second face opposed to the first face;
a first region having a prescribed thickness in the normal direction to a tangential line to the first face; and
a second region including a region that is thicker than the prescribed thickness of the first region,
wherein the first region is a continuous region having a thickness range of a minimum thickness $W_A$ to $1.1 \times W_A$,
the second region includes a region having a thickness larger than $1.1 \times W_A$ and has a maximum thickness $W_B$,
the second region has a portion where a compressive stress layer is formed deeper than a compressive stress layer of the first region,
a depth $L_A$ of the compressive stress layer from the first face at a position having the thickness $W_A$ and a depth $L_B$ of the compressive stress layer from the first face at a position having the thickness $W_B$ satisfy a relation $L_B/L_A \geq 1.2$, and
the depth $L_A$ of the compressive stress layer and the depth $L_B$ of the compressive stress layer each are larger than or equal to 80 μm.

2. The chemically strengthened glass plate according to claim 1, wherein the $W_A$ is larger than or equal to 0.3 mm, and the chemically strengthened glass plate satisfies a relation $W_B/W_A \geq 1.5$.

3. The chemically strengthened glass plate according to claim 1, wherein, in the first face, a ratio of a projection area of the first region to a total projection area is larger than or equal to 0.5.

4. The chemically strengthened glass plate according to claim 1, wherein, in the first region and the second region, when a depth from the first face is represented by x, a compressive stress value at the depth x from the first face is represented by σ, and a depth at which the compressive stress value σ is equal to 0 is represented by a compressive stress depth L, a gradient $[d\sigma/dx]_{x=L}$ of a curve of the compressive stress value σ is larger than or equal to −2.

5. The chemically strengthened glass plate according to claim 1, wherein the $L_A$ and the $W_A$ satisfy a relation $L_A/W_A \geq 0.15$.

6. The chemically strengthened glass plate according to claim 1, wherein the second region extends in a direction that is different from a formation direction of the first region.

7. The chemically strengthened glass plate according to claim 1, wherein at least one of the first face and the second face has a curved portion where a radius of curvature is smallest.

8. The chemically strengthened glass plate according to claim 1, containing at least lithium.

9. A portable information terminal comprising the chemically strengthened glass plate according to claim 1.

10. The chemically strengthened glass plate according to claim 1, comprising $Li_2O$, $Al_2O_3$, and $SiO_2$.

11. A method for manufacturing a chemically strengthened glass plate, the method comprising:
a step of preparing a flat glass plate having a constant thickness;
an uneven thickness glass plate forming step in which a thickness of the flat glass plate having, in a plan view, a first region and a second region that is located outside the first region is made uneven so that the first region has a portion having a thickness that is thinner than a thickness of the second region to form an uneven thickness glass plate;
a bending step of bending the uneven thickness glass plate so as to differentiate an extending direction of the first region and an extending direction of the second region to form a three-dimensional glass plate; and
a chemically strengthening treatment step of subjecting the three-dimensional glass plate to a chemically strengthening treatment so that a depth $L_A$ of a compressive stress layer at a position having a thickness $W_A$ which is a minimum thickness in the first region of the three-dimensional glass plate and a depth $L_B$ of a compressive stress layer at a position having a thickness $W_B$ which is a maximum thickness in the second region of the three-dimensional glass plate satisfy a relation $L_B/L_A \geq 1.2$, and the depth $L_A$ of the compressive stress layer and the depth $L_B$ of the compressive stress layer each are larger than or equal to 80 μm.

12. The method for manufacturing a chemically strengthened glass plate according to claim 11, further comprising, between the bending step and the chemically strengthening treatment step, a polishing step of polishing a surface of the three-dimensional glass plate.

13. The method for manufacturing a chemically strengthened glass plate according to claim 11, wherein the uneven thickness glass plate forming step comprises:
   a heat-shaping step of heating the flat glass plate to a temperature that is higher than or equal to a glass transition temperature of a glass material of the flat glass plate, and shaping the heated glass plate with a die; and
   after the heat-shaping step, a cooling step of cooling the heat-shaped glass plate to a temperature that is lower than the glass transition temperature of the glass material.

14. The method for manufacturing a chemically strengthened glass plate according to claim 11, wherein the uneven thickness glass plate forming step comprises at least one of a step of polishing the first region of the flat glass plate and a step of grinding the first region of the flat glass plate.

15. A method for manufacturing a chemically strengthened glass plate, the method comprising:
   a step of preparing a flat glass plate having a constant thickness;
   a bending step of bending the flat glass plate having, in a plan view, a first region and a second region that is located outside the first region so as to differentiate an extending direction of the first region and an extending direction of the second region to form a three-dimensional glass plate;
   an uneven thickness glass plate forming step in which a thickness of the three-dimensional glass plate is made uneven so that the first region of the three-dimensional glass plate has a portion having a thickness that is thinner than a thickness of the second region of the three-dimensional glass plate to form an uneven thickness three-dimensional glass plate; and
   a chemically strengthening treatment step of subjecting the uneven thickness three-dimensional glass plate to a chemically strengthening treatment so that a depth $L_A$ of a compressive stress layer at a position having a thickness $W_A$ which is a minimum thickness in the first region of the uneven thickness three-dimensional glass plate and a depth $L_B$ of a compressive stress layer at a position having a thickness $W_B$ which is a maximum thickness in the second region of the uneven thickness three-dimensional glass plate satisfy a relation $L_B/L_A \geq 1.2$, and the depth $L_A$ of the compressive stress layer and the depth $L_B$ of the compressive stress layer each are larger than or equal to 80 μm.

16. A method for manufacturing a chemically strengthened glass plate, the method comprising:
   a step of preparing a flat glass plate having a constant thickness;
   an uneven-thickness bent glass plate forming step in which the flat glass plate having, in a plan view, a first region and a second region that is located outside the first region is bent so as to differentiate an extending direction of the first region and an extending direction of the second region, while a thickness of the flat glass plate is made uneven so that the first region has a portion having a thickness that is thinner than a thickness of the second region, to form an uneven thickness three-dimensional glass plate; and
   a chemically strengthening treatment step of subjecting the uneven thickness three-dimensional glass plate to a chemically strengthening treatment so that a depth $L_A$ of a compressive stress layer at a position having a thickness $W_A$ which is a minimum thickness in the first region of the uneven thickness three-dimensional glass plate and a depth $L_B$ of a compressive stress layer at a position having a thickness $W_B$ which is a maximum thickness in the second region of the uneven thickness three-dimensional glass plate satisfy a relation $L_B/L_A \geq 1.2$, and the depth $L_A$ of the compressive stress layer and the depth $L_B$ of the compressive stress layer each are larger than or equal to 80 μm,
   wherein the uneven-thickness bent glass plate forming step comprises:
   a heat-shaping step of heating the flat glass plate to a temperature that is higher than or equal to a glass transition temperature of a glass material of the flat glass plate, and shaping the heated glass plate with a die; and
   after the heat-shaping step, a cooling step of cooling the heat-shaped glass plate to a temperature that is lower than the glass transition temperature of the glass material.

17. The method for manufacturing a chemically strengthened glass plate according to claim 16, further comprising, between the uneven-thickness bent glass plate forming step and the chemically strengthening treatment step, a polishing step of polishing a surface of the uneven thickness three-dimensional glass plate.

* * * * *